(12) United States Patent
Kulkarni et al.

(10) Patent No.: US 7,737,910 B2
(45) Date of Patent: Jun. 15, 2010

(54) SCALABLE DISPLAY

(75) Inventors: Harish Sripad Kulkarni, Redmond, WA (US); Sergey Solyanik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1436 days.

(21) Appl. No.: 10/728,273

(22) Filed: Dec. 4, 2003

(65) Prior Publication Data

US 2005/0125488 A1    Jun. 9, 2005

(51) Int. Cl.
    *G09G 5/00*    (2006.01)
(52) U.S. Cl. ...................................... 345/1.1
(58) Field of Classification Search ........... 345/1.1–1.3, 345/904, 2.1, 303, 903; 340/771; 348/383
    See application file for complete search history.

(56) References Cited

U.S. PATENT DOCUMENTS

| | | | | |
|---|---|---|---|---|
| 4,562,450 | A * | 12/1985 | Ellis et al. ................... | 345/68 |
| 5,361,078 | A * | 11/1994 | Caine .......................... | 345/1.3 |
| 6,348,933 | B1 | 2/2002 | Walls et al. | |
| 6,502,107 | B1 * | 12/2002 | Nishida ..................... | 707/104.1 |
| 6,611,241 | B1 * | 8/2003 | Firester et al. ............... | 345/1.3 |
| 6,999,045 | B2 * | 2/2006 | Cok ............................ | 345/1.3 |
| 2003/0004806 | A1 * | 1/2003 | Vaitekunas .................. | 705/14 |
| 2005/0030255 | A1 * | 2/2005 | Chiu et al. ................... | 345/1.3 |

OTHER PUBLICATIONS

European Search Report for Application No. EP04026924 mailed on Nov. 9, 2007, 3 pgs.
"Building and Using a Scalable Display Wall System", Li et al., IEEE Computer Graphics and Applications, Jul./Aug. 2000, pp. 29-37.
"Data distribution strategies for high-resolution displays", Chen et al., Computer & Graphics 25, 2001, Elsevier Science Ltd., pp. 811-818.
"Software Environments for Cluster-based Display Systems", Chen et al., IEEE, 2001, pp. 202-210.
"Towards Point-based Acquisition and Rendering of Large Real-World Environments", Correa et al., IEEE, 2002, pp. 59-66.

* cited by examiner

*Primary Examiner*—Richard Hjerpe
*Assistant Examiner*—Shaheda A Abdin
(74) *Attorney, Agent, or Firm*—Lee & Hayes, PLLC (57) ABSTRACT

A display system and methods provide for a large, high-resolution display that is scalable. The scalable display is made up of a number of smaller displays. The resolution of the scalable display is the combined resolutions of the smaller displays according to the vertical and horizontal layout of the smaller displays. The system includes an intermediate computer that acts as a primary client to a network computer to request and receive video data at the resolution of the scalable display. The intermediate computer reconfigures video data from a format consistent with the large, scalable display coordinates to a format consistent with the coordinates of the individual smaller displays. The intermediate computer sends reconfigured video data to the smaller displays (through clients) according to which portion of the scalable display each of the smaller displays supports.

13 Claims, 7 Drawing Sheets

Fig. 7 ically by a separate client computer 108, support a section of a large, high-resolution display.

SCALABLE DISPLAY

TECHNICAL FIELD

The present disclosure relates to display devices, and more particularly, to the use of multiple display devices in a single, high-resolution and scalable display.

BACKGROUND

Current display systems such as projector systems and computer monitors have limitations when it comes to the size and quality of images they can display. The limitations result in a tradeoff between the size of a display and the quality of images presented on the display. More specifically, as the display size increases, the quality of the displayed image decreases. For example, the maximum resolution of a conference room projector system is currently 1024×768 image pixels. Regardless of the size of the display being projected from the projector, the resolution remains constant. Therefore, the same number of image pixels is used to display a projected image no matter what the size of the display. An increase in the display size (e.g., by backing up the projector) results in the stretching of each image pixel to cover a larger display surface, which degrades the quality of the image being displayed.

The maximum resolution of display systems is ever-increasing. However, the relative cost increases associated with systems providing increased display resolution beyond the current level of 1024×768 is significant to the extent that such systems are prohibitively expensive for many consumers.

Accordingly, a need exists for a way to provide an inexpensive, high-resolution, and scalable display.

SUMMARY

A system and related methods are described for providing a high-resolution scalable display.

In accordance with one implementation, an intermediate computer acts as a gateway computer between a network computer and multiple client computers. The intermediate computer receives configuration information regarding a large display wherein the large display is made up of multiple small displays. The intermediate computer determines a resolution of the large display based on the configuration information and sends a request over a computer network to the network computer for video data at the large screen resolution. The intermediate computer receives the video data configured for the large display and reconfigures the video data for display on the small displays that make up the large display.

BRIEF DESCRIPTION OF THE DRAWINGS

The same reference numerals are used throughout the drawings to reference like components and features.

DETAILED DESCRIPTION

Overview

The following discussion is directed to systems and methods that provide for a large, high-resolution display that is scalable. The large display itself is made up of a number of smaller displays, each supporting a section of the large display. The resolution of the large display is the combined resolutions of the smaller displays according to the vertical and horizontal layout of the smaller displays. The system includes an intermediate computer that acts as a primary client to a network computer. The intermediate computer communicates with the network computer to request and receive video data at the large display resolution. The intermediate computer reconfigures video data from a format consistent with the large display coordinates to a format consistent with the coordinates of the individual smaller displays that make up the large display. The intermediate computer sends reconfigured video data to the smaller displays (through secondary clients) according to which portion of the large display each of the smaller displays supports.

Advantages of the described systems and methods include the ability to grow a display size with increasing numbers of small displays while maintaining a high display resolution. Another advantage of the scalable display is its relatively low cost of creation through the use of commonly available smaller displays and existing terminal service systems. Another advantage of the scalable display system is the ease with which it can be maintained through the simple replacement of failed components with other readily available components. This is in contrast to a high-resolution system that may be rendered unavailable if a portion of the system fails.

Exemplary Environment

Figure 1:
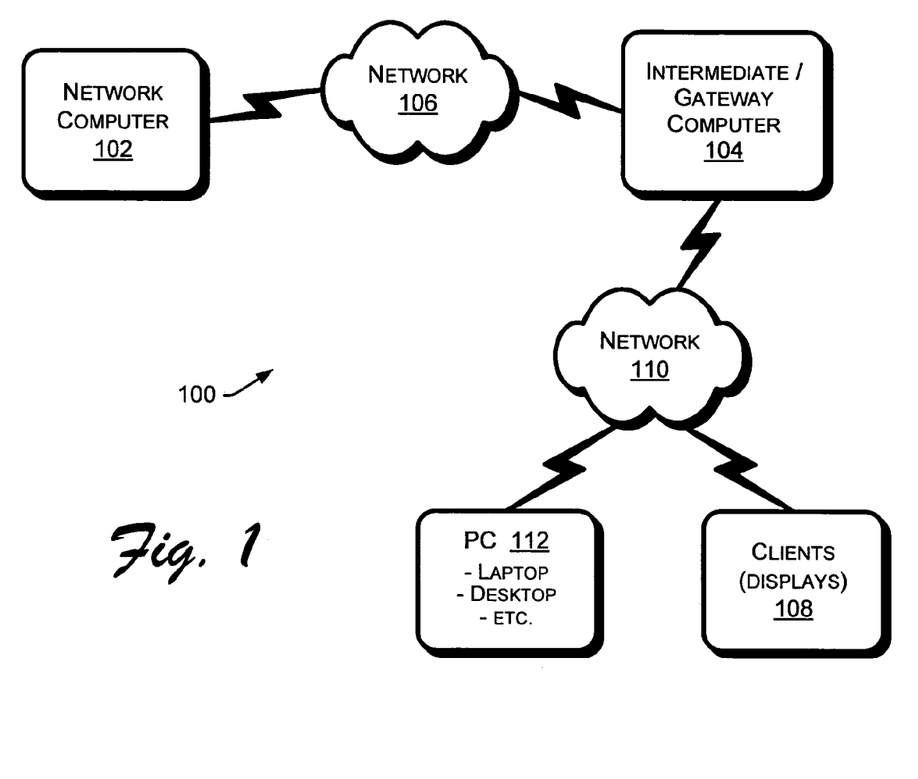
FIG. 1 illustrates an exemplary environment suitable for providing a scalable display system.

FIG. 1 shows an exemplary environment 100 suitable for providing a scalable display system. Exemplary environment 100 includes a network computer 102 that handles requests for data, such as requests for video data from intermediate computer 104 over a computer network 106. Although network 106 is typically a remote IP (Internet Protocol) network connection, it can also include local connections depending on the particular system configuration. Thus, network 106 may include, for example, any one or a combination of a modem, a cable modem, a LAN (local area network), a WAN (wide area network), an intranet, the Internet, or any other suitable communication link. Network computer 102 and intermediate computer 104 may both be implemented as a variety of general purpose computing devices such as a server computer, a workstation computer, a desktop computer, a laptop computer, or other form of personal computer (PC), and may be configured in a manner similar to an exemplary computer implementation described below with reference to FIG. 7. Network computer 102 provides storage for electronic documents and information including various multi-media content that is accessible by intermediate computer 104 over computer network 106.

Exemplary environment 100 also includes multiple client computers 108 that each drive a single display device, such as a computer screen or a projector for illuminating a display. As discussed below, the multiple smaller displays, each driven by a client 108, make up a large scalable display whose resolution is a function of the number of smaller displays combined to make up the larger display. Clients 108 may be implemented as any of a variety of client computing devices including, for example, a "thin client", a desktop computer, a server computer, a laptop computer, or other form of personal computer (PC), and may be configured in a manner similar to an exemplary computer implementation described below with reference to FIG. 7. As a "thin client", client 108 would be similar to a PC, but may not include local storage capabilities. Thin clients also generally have an input device such as a mouse in addition to other communications capabilities.

Clients 108 receive video data from intermediate computer 104 through a network 110. Although network 110 is typically a local connection such as a LAN, it can also include remote connections depending on the particular system configuration. Thus, network 110 may include, for example, any one or a combination of a modem, a cable modem, a LAN (local area network), a WAN (wide area network), an intranet, the Internet, or any other suitable communication link. To facilitate the transfer and display of video data from network computer 102 to clients 108, intermediate computer 104 acts as a gateway device that presents itself as a single client to the network computer 102 while presenting itself as a server to the multiple clients 108.

In one embodiment, the exemplary environment 100 may be implemented in the context of a terminal services architecture, such as that provided by Windows 2000 Terminal Services from Microsoft® Corporation of Redmond, Wash. In such a context, network computer 102 acts as a terminal server and intermediate computer 104 acts as a primary client to network computer 102. A remote terminal services environment using a remote protocol, such as Microsoft's RDP (Remote Desktop Protocol), permits centralized deployment, maintenance and management of software, along with the re-use of existing hardware and thin-client terminal usage that reduces the overall costs of a system. A terminal services-type architecture significantly decreases the amount of time and money spent to upgrade, maintain and troubleshoot a system. In such a system, only keyboard and mouse data would travel to the network computer 102 from the intermediate computer 104, and only screen data (e.g., drawing instructions from video data) would be returned from the network computer 102 to the intermediate computer 104. The keyboard and mouse would be connected to intermediate computer 104, which acts as the client to network computer 102. In general, cursor management would be managed at the intermediate computer 104 in such a way that only one of the smaller displays (driven by a client 108) has an active cursor. When the mouse is moved such that it crosses boundaries between smaller displays, the intermediate computer 104 would send a command to network computer 102 that the cursor position is lost and to reset its cursor to a null cursor. Another command would be sent to set its cursor position and shape to the appropriate value on a different smaller display driven by a different client 108.

Exemplary environment 100 may also include a personal computer 112 or some other form of computer that is operatively coupled to intermediate computer 104 at various times, either directly or through a network (e.g., network 106, network 110), to provide configuration information to intermediate computer 104 regarding the physical layout and configuration of small displays that are combined to make up a large display.

Exemplary Embodiments

Figure 2:
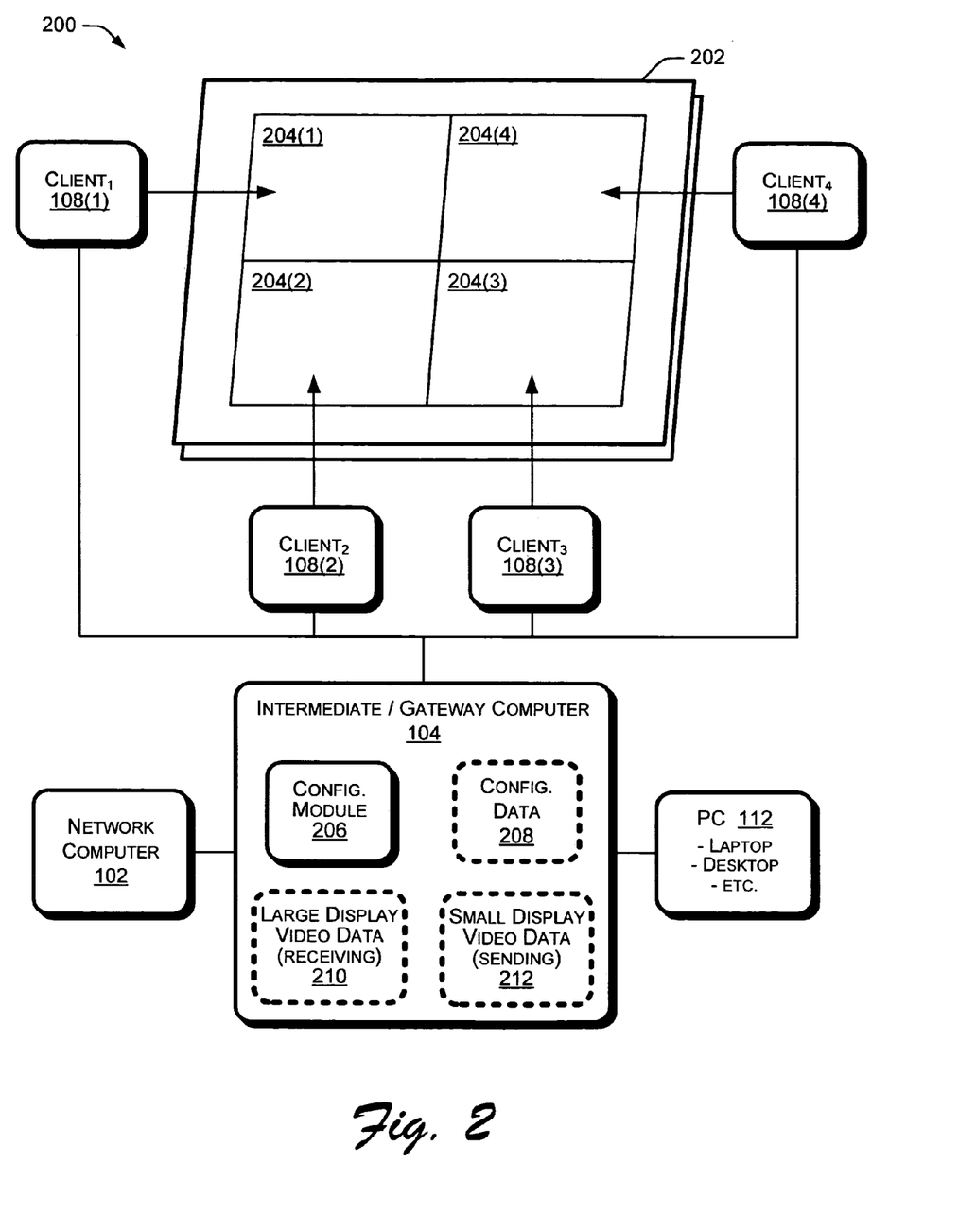
FIG. 2 illustrates an exemplary block diagram representation of a scalable display system.
Figure 3:
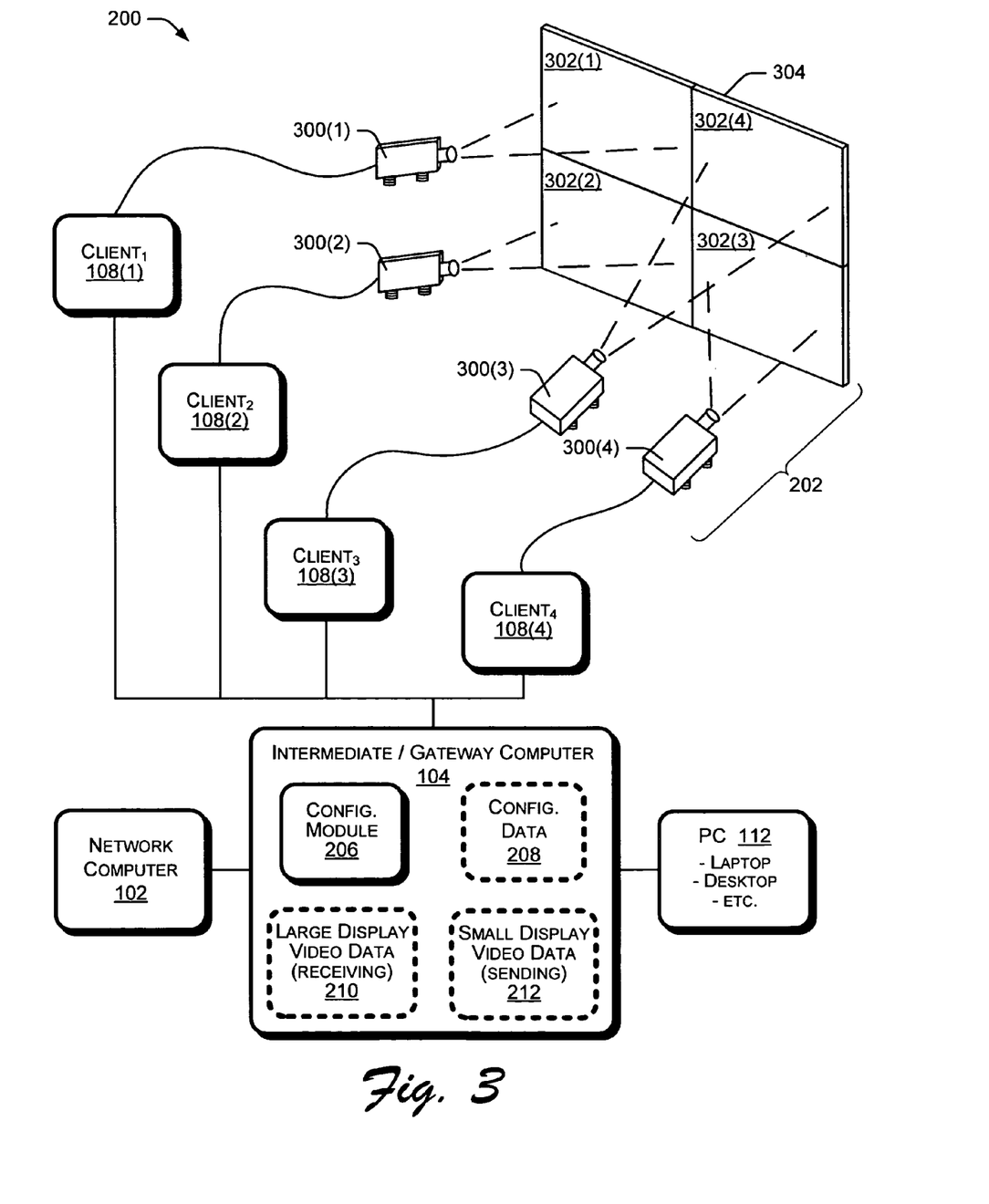
FIG. 3 illustrates an embodiment of a scalable display comprising multiple projectors.

FIG. 2 is a block diagram representation of an exemplary scalable display system 200. Scalable display 202 is a single high-resolution display comprising multiple physical display devices 204 that are each supported by a client device 108. Display devices 204 can be implemented in various ways including, for example, as computer monitors, CRT screens, or flat panel displays. For any given scalable display 202, the display devices 204 making up the scalable display 202 may be all the same, or they may vary in height and/or width to accommodate a particular design for scalable display 202. For example, several flat panel displays of the same height but varying widths may be arranged as an arc of a circle to produce a very wide display 202. In another application, a set of projectors, each driven by a client 108, may be configured to cover varying portions of an overhead dome (e.g., the inside of a planetarium). Accordingly, as illustrated in FIG. 3, a scalable display system 200 can be implemented using multiple projectors 300, or other similar illumination devices, each illuminating a different section 302 of a display surface area 304. Thus, a scalable display 202 may comprise multiple projectors 300 along with the display surface area 304 being illuminated as generally illustrated in FIG. 3. Although the following discussion makes primary reference to the exemplary scalable display system 200 of FIG. 2, it generally applies in an equivalent manner to the exemplary scalable display system 200 of FIG. 3.

Referring to FIG. 2, display devices 204(1), 204(2), 204(3), and 204(4) are assembled into a grid that forms the larger scalable display 202. Although only 4 display devices 204(1), 204(2), 204(3), and 204(4) are illustrated as making up scalable display 202, it is noted that virtually any number of such devices may be combined in a similar fashion to scale the size and resolution of scalable display 202. Thus, additional displays 204 may be combined to extend scalable display 202 both vertically and horizontally. Furthermore, as the number of displays 204 increases, a scalable display 202 is not limited to a particular ratio of vertical length to horizontal length. That is, scalable display 202 may be configured to be longer horizontally than vertically, or longer vertically than horizontally, for example.

In addition, as the size of any given scalable display 202 is increased by combining additional display devices 204, the resolution of the scalable display 202 increases accordingly. Therefore, the same number of image pixels is employed to implement a certain sized section of scalable display 202 regardless of how the overall size of scalable display 202 may increase or decrease. Thus, the number of image pixels per surface area of scalable display 202 remains constant. One beneficial result is that there is no loss in the quality of images displayed on scalable display 202 as the size of scalable display 202 is increased. In fact, the quality of any given image can improve as the size of scalable display 202 is increased, because there will be a greater number of image pixels to express a decreasing amount of the given image.

Figure 4:
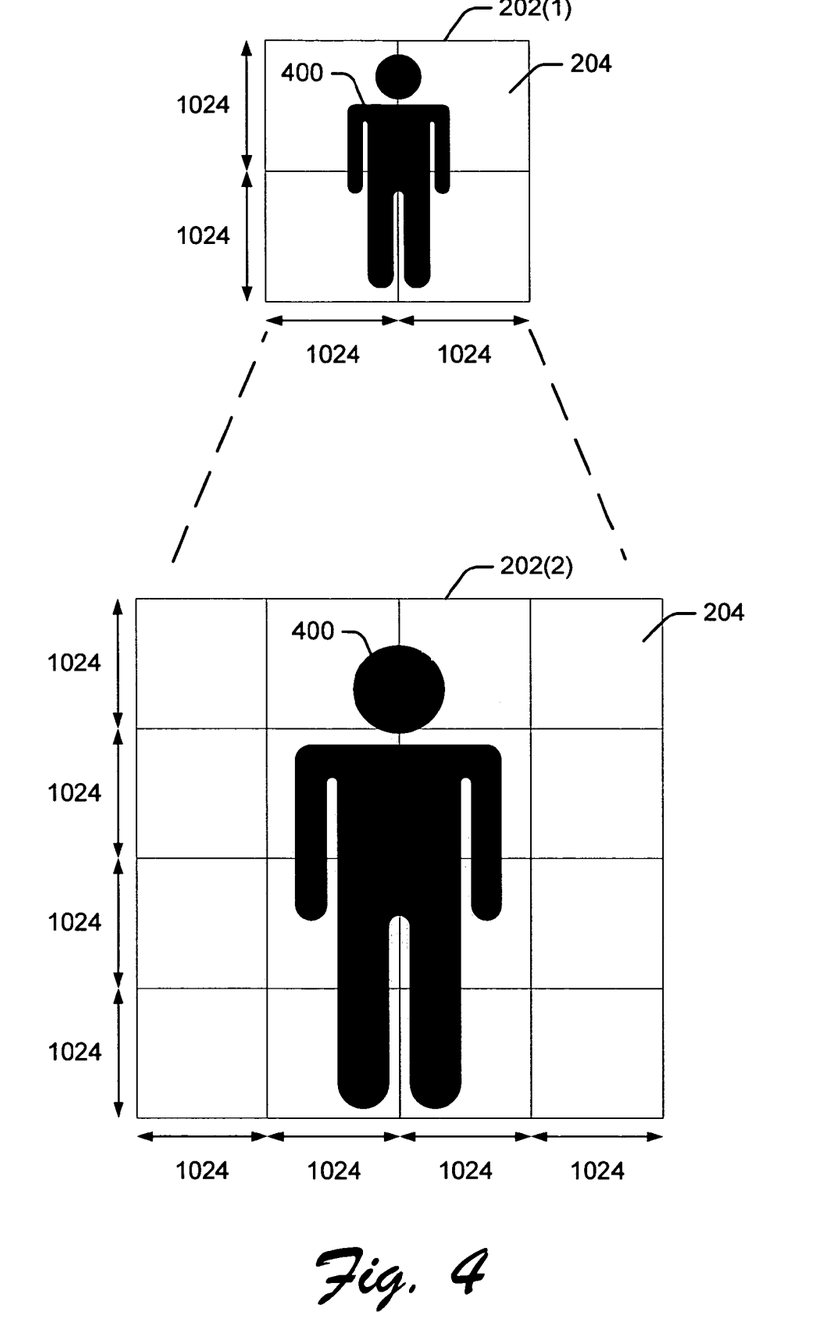
FIG. 4 illustrates an example of how a scalable display may be scaled up in size.

FIG. 4 illustrates this advantage by showing an example of how a scalable display 202 may be scaled up in size. For a given image, assuming sufficient image data is available, the example illustrates how scaling up the size of a scalable display 202 can improve the quality of the displayed image because of the greater number of image pixels employable to express the image. For ease of discussion, the smaller display devices 204 making up the scalable display 202 are illustrated as having a resolution of 1024×1024. In the first display 202(1) of FIG. 4, the overall resolution is the combination of resolutions of the individual display devices 204. Thus, the overall resolution of the first display 202(1) is 2048×2048. To scale up the first display 202(1), additional display devices 204 are added in the vertical and horizontal directions. In the FIG. 4 example, the second display 202(2) has been scaled up to include 16 display devices. The overall resolution of the scaled up second display 202(2) thus becomes 4096×4096. It is therefore apparent, that for a given image such as image 400, a greater number of image pixels are employed to display the image 400. This results in finer detail in the displayed image 400 and an increased image quality.

Referring again to FIG. 2, each of the display devices 204(1), 204(2), 204(3), and 204(4) is supported or driven by a client computer 108. Each client 108 receives drawing data from intermediate computer 104 that is formatted for display based on the coordinates of a corresponding display device 204. Thus, client, 108(1) receives drawing data from intermediate computer 104 that is formatted for display on display device 204(1).

Intermediate computer 104 is a gateway device that presents itself as a single client to network computer 102, while presenting itself as a server to each of the clients 108. Intermediate computer 104 includes configuration module 206 and configuration data 208. Such components are discussed in the general context of computer/processor-executable instructions that are executable, for example, by a personal computer. Program modules generally include routines, programs, objects, components, data structures, etc., that perform particular tasks or implement particular abstract data types. Configuration module 206 is configured to receive configuration data 208 from a source such as PC 112. PC 112 is illustrated in FIG. 2 as one way in which configuration data 208 can be entered into intermediate computer 104. Thus, a user may implement configuration module 206 on intermediate computer 104 in order to enter configuration data 208 remotely through a Web browser running on PC 112. This is, however, only one of various ways a user may enter configuration data 208 into intermediate computer 104. For example, intermediate computer 104 may be configured with input/output devices (e.g., a keyboard and display—not shown) enabling a user to enter configuration data 208 locally. In another embodiment, each client 108 provides configuration information to intermediate computer 104 regarding the size and position of a corresponding display device 204 the client 108 is driving. For example, client 108(1) may provide configuration information to intermediate computer 104 regarding display device 204(1), and so on.

Configuration data 208 includes information about which network computer 102 to connect to, the size of the overall scalable display 202, and the display devices 204 that make up scalable display 202. Information about the display devices 204 includes an identification (e.g., a name) for each display device 204, a physical location or position of each display device 204 within the scalable display 202, and a display resolution for each display device 204.

In addition to receiving configuration data 208, configuration module 206 is also configured to communicate with network computer 102. Configuration module 206 sends requests to network computer 102 over network 106 asking for video data to be sent to intermediate computer 104 at particular display resolutions. The resolution requested depends on the overall resolution of the large scalable display 202. As discussed above, the overall resolution of the large scalable display 202 is the combination of the resolutions of the individual display devices 204. Thus, if the resolution of individual display devices 204 in FIG. 2 is 1024×768, then the resolution of the large scalable display 202 is 2048×1536. Based on configuration data 208, configuration module 206 determines the resolution of large scalable display 202 and makes requests for video data to network computer 102 accordingly. Network computer 102 honors requests for video data at whatever resolution is specified by configuration module 206 of intermediate computer 104. Because the video data received from network computer 102 is received in a format intended for display on a large display (i.e., according to the resolution requested from configuration module 206), it is illustrated in FIGS. 2 and 3 on intermediate computer 104 as "large display video data" 210.

Figure 5:
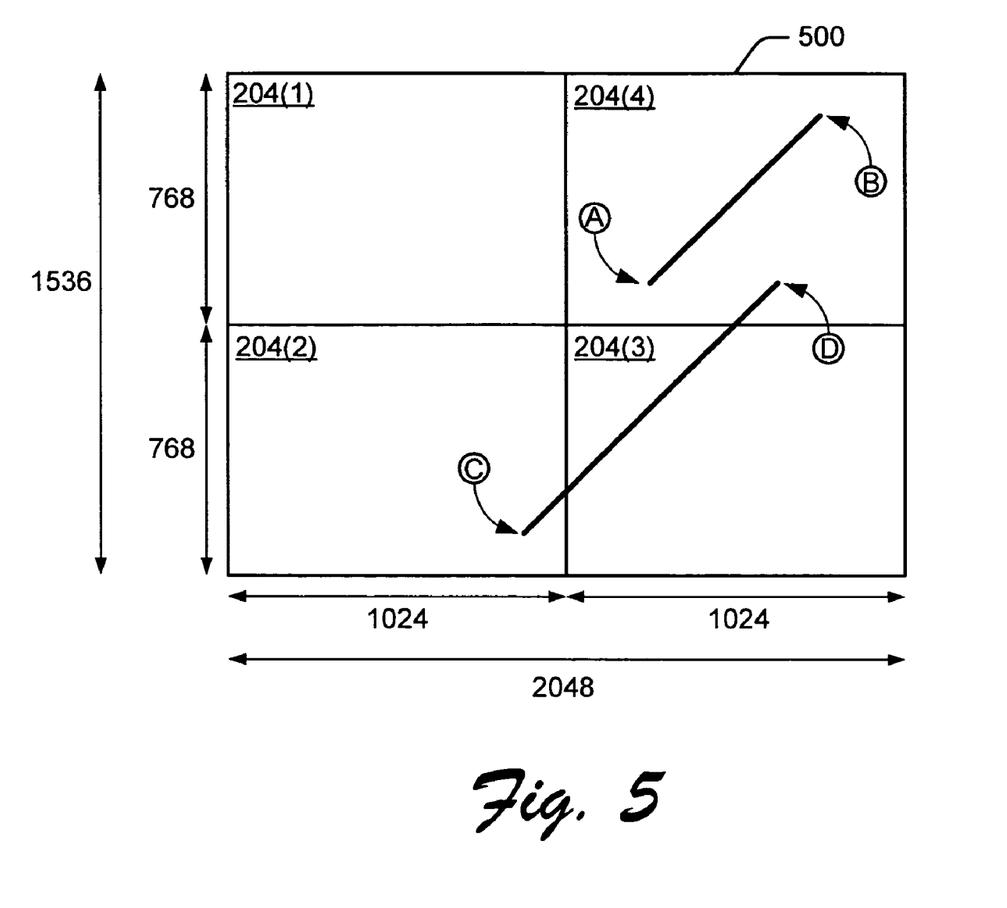
FIG. 5 illustrates how large display video data may be reconfigured as small display video data.

After intermediate computer 104 receives the large display video data 210 from network computer 102, configuration module 206 analyzes the data 210 and reconfigures it for display on appropriate display devices 204. The reconfigured large display video data 210 is illustrated in FIGS. 2 and 3 on intermediate computer 104 as small display video data 212. FIG. 5 helps to illustrate how large display video data 210 may be reconfigured. Display 500 of FIG. 5 represents a large scalable display made up of 4 display devices 204(1), 204(2), 204(3), and 204(4). The large scalable display 500 shows a first drawing extending from point A to point B, and a second drawing that extends from point C to point D. According to the large display video data 210, a drawing instruction for the first drawing would include the coordinates (1280,896) to identify point A, and the coordinates (1792,1408) to identify point B. However, because the first drawing is located on display device 204(4) of the large scalable display 500, the coordinates for the drawing instruction must be converted from the large display 500 configuration to a small display configuration that is appropriate for display device 204(4). Configuration module 206 knows the resolution and the relative location of display device 204(4) from configuration data 208, and it uses this information to determine the appropriate coordinates for the first drawing to be displayed on display device 204(4). Thus, configuration module 206 converts large display video data 210 coordinates (1280,896) into small display video data 212 coordinates (256,128) to identify point A within display device 204(4). Likewise, configuration module 206 converts large display video data 210 coordinates (1792,1408) into small display video data 212 coordinates (768,640) to identify point B within display device 204(4). Configuration module 206 on intermediate computer 104 sends the small display video data 212 values to the appropriate display device 204(4) for display.

The second drawing shown in FIG. 5 that extends from point C to point D provides another example of how configuration module 206 analyzes large display video data 210 and converts it for display as small display video data 212. The second drawing extending from point C to point D traverses 3 different display devices, 204(2), 204(3), and 204(4). Large display video data 210 from network computer 102 will express the second drawing with a single drawing command that identifies points C and D using coordinates appropriate for large scalable display 500. However, because the second drawing spans 3 different display devices, a new drawing command is created for each display device (i.e., 204(2), 204(3), and 204(4)) that describes the portion of the drawing to be displayed in each of the display devices. As an example, the portion of second drawing located in display device 204(2) may be defined in a drawing command with coordinates (896,128) to identify point C, and coordinates (1024,256) to identify the end of the portion of the second drawing at the edge of display device 204(2). Configuration module 206 on intermediate computer 104 analyzes all the large display video data 210 and converts it to small display video data 212 in this manner so that it can be sent to the appropriate display device 204 for display on the large scalable display 500.

In another embodiment, one of the client computers 104 may act as the intermediate computer 104. Thus, intermediate computer 104 and one of the client computers 104 may be one and the same computer device. In such a configuration, the intermediate computer 104 operates in a manner similar to that discussed above. That is, it receives configuration information 208 regarding the large scalable display 202, the small displays 204, and network computer 102, and it requests and receives large display video data 210 based on the configuration information 208. It then proceeds to reconfigure the large display video data 210 into small display video data 212 and distributes the small display video data 212 to the appropriate client 108 for display.

Exemplary Methods

Example methods for providing a scalable display will now be described with primary reference to the flow diagram of FIG. 6. The methods apply to the exemplary embodiments discussed above with respect to FIGS. 1-5. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 6:
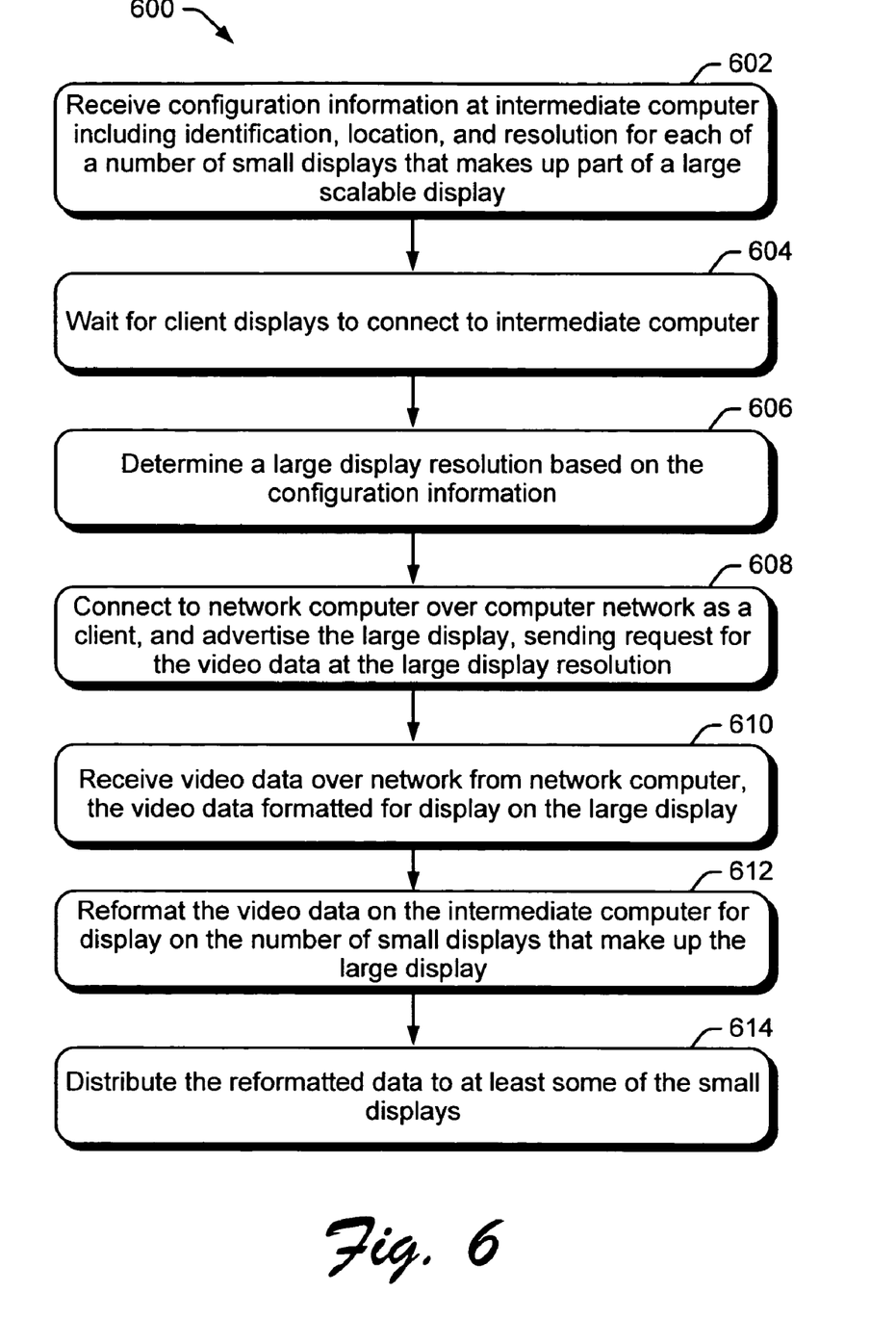
FIG. 6 illustrates a block diagram of exemplary methods for providing a scalable display.

FIG. 6 shows an exemplary method 600 for providing an integrated spatial view of scheduling information. At block 602, spatial configuration information is received at an intermediate computer 104. The spatial configuration information includes a location, identification, and resolution for each of the small displays that make up a large scalable display. The configuration information can be entered in various ways, such as by a user via a PC 112 or on an individual basis from each client computer 108.

At block 604, the intermediate computer 104 waits for the client computers 108 to connect to it. In this respect, the intermediate computer 104 acts as a server to each of the client computers 108. At block 606, a large display resolution is determined based on the configuration information. Intermediate computer 104 determines the resolution of the large display 202 on the basis of the size and position of each of the multiple small displays 204 that make up large display 202.

At block 608, the intermediate computer 104 connects to network computer 102 over a computer network. The intermediate computer 104 advertises itself as a client having a large display, and it sends a request to the network computer 102 asking for the video data to be transmitted at the large display resolution. The network computer 102 honors the request, without knowing that the video data will be broken up and displayed on multiple small displays.

At block 610, video data intended for a large display is received at intermediate computer 104. The video data is formatted for display on the large display. At block 612, the intermediate computer 104 reformats the video data so that it can be displayed on a number of small displays that make up the large display. At block 614, the reformatted video data is distributed to at least some of the small displays. The distribution of reformatted data is made to appropriate clients 108 that each drive a small display.

While one or more methods have been disclosed by means of flow diagrams and text associated with the blocks of the flow diagrams, it is to be understood that the blocks do not necessarily have to be performed in the order in which they were presented, and that an alternative order(s) may result in similar advantages. Furthermore, the methods are not exclusive and can be performed alone or in combination with one another.

Exemplary Computer

Figure 7:
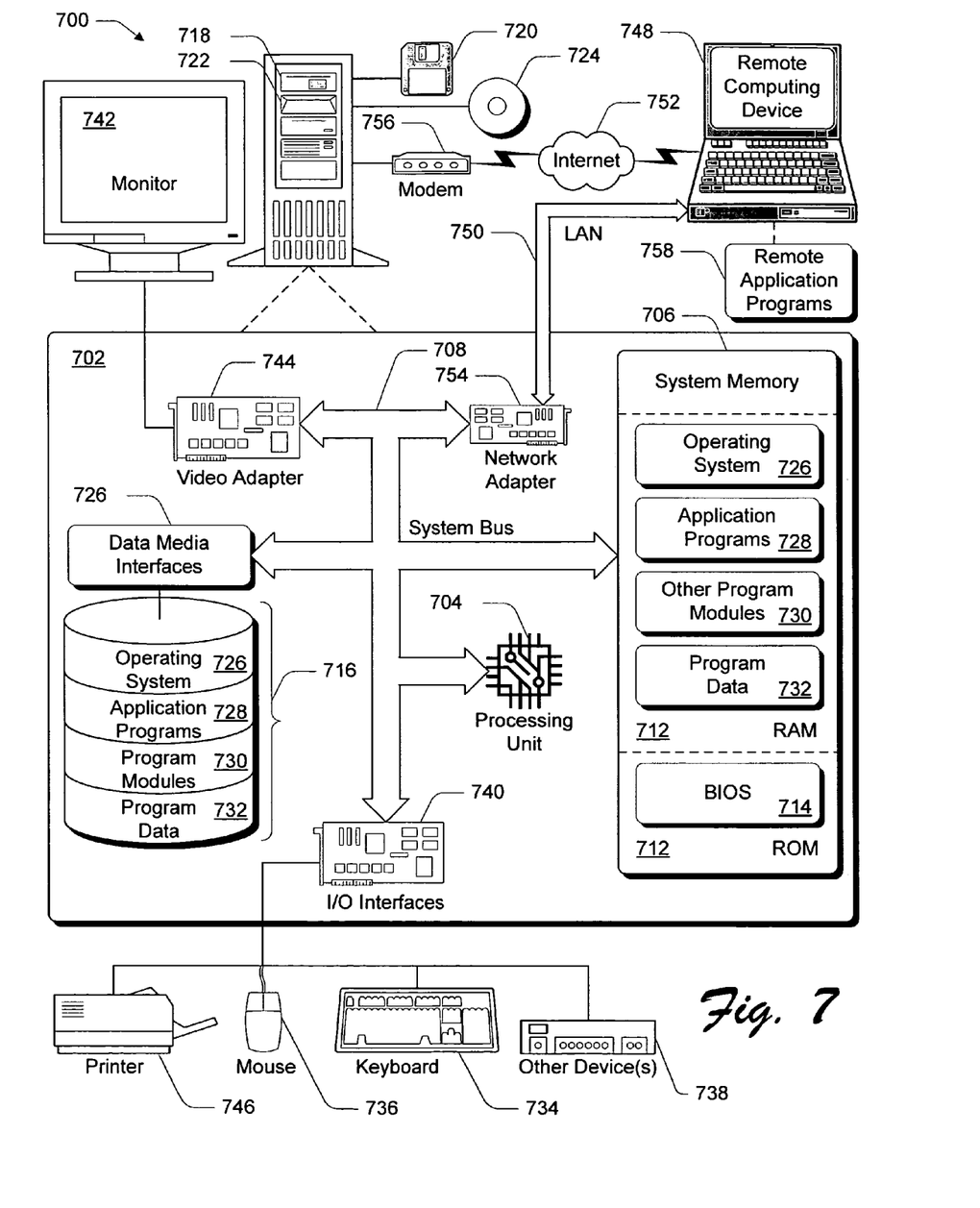
FIG. 7 illustrates an exemplary computing environment suitable for implementing a network computer, an intermediate computer, a client, and a PC, such as those shown in the exemplary environment of FIG. 1.

FIG. 7 illustrates an exemplary computing environment suitable for implementing a network computer 102, an intermediate computer 104, a client computer 108, and a PC 112, all as discussed above with reference to FIGS. 1-6. Although one specific configuration is shown in FIG. 7, the network computer 102, intermediate computer 104, client computer 108, and PC 112 may be implemented in other computing configurations.

The computing environment 700 includes a general-purpose computing system in the form of a computer 702. The components of computer 702 may include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. An example of a system bus 708 would be a Peripheral Component Interconnects (PCI) bus, also known as a Mezzanine bus.

Computer 702 includes a variety of computer-readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 may be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of a caching scheme for user network access information.

Computer 702 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device may also be connected to the system bus 708 via an interface, such as a video adapter 744. In addition to the monitor 742, other output peripheral devices may include components such as speakers (not shown) and a printer 746 which can be connected to computer 702 via the input/output interfaces 740.

Computer 702 may operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that may include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    advertising, from a primary terminal client coupled to a plurality of small displays, the availability of a contiguous large display to a terminal server, the large contiguous display comprising the plurality of small displays that are controlled by thin clients, the primary terminal client being a gateway device that presents itself as a single client to the terminal server while presenting itself as another server to the thin clients;
    receiving a remote terminal services environment over a network from the terminal server at the primary terminal client, the remote terminal services environment formatted for display on the large contiguous display that comprises the plurality of small displays;
    receiving configuration information respectively from a plurality of thin clients at the primary terminal client, each of the received configuration information including attribute information associated with a small display that is part of the large contiguous display;
    reformatting the remote terminal services environment on the primary terminal client for display on a number of the plurality of small displays that are part of the large contiguous display;
    distributing reformatted remote terminal services environment from the primary terminal client to at least some of the small displays; and
    managing an active cursor that is displayed on the large contiguous display to pass the active cursor from one of the small displays to another of the small displays in response a mouse movement received by the primary terminal client.

2. A method as recited in claim 1, wherein the distributing comprises distributing the reformatted remote terminal services environment to the thin clients, each of the plurality of thin clients configured to drive one of the small displays being part of the large contiguous display.

3. A method as recited in claim 1, further comprising:
determining a large contiguous display resolution based on the received configuration information from the plurality of thin clients; and
sending a request to the terminal server from the primary terminal client to transfer the video data from the network computer to the primary terminal client at the large contiguous display resolution, and
wherein the received configuration information from each of the plurality of thin clients includes an identification, a location and a screen resolution for one of the small displays that is part of the large contiguous display.

4. A method as recited in claim 1, wherein the reformatting comprises converting coordinates of drawing commands from large contiguous display coordinates into small display coordinates.

5. A method as recited in claim 1, wherein the reformatting comprises creating multiple drawing commands from a single drawing command, wherein the single drawing command would otherwise control a drawing that spans two or more of the small displays.

6. A processor-readable medium storing processor-executable instructions configured for:
advertising, from a primary terminal client coupled to a plurality of small displays, the availability of a large contiguous display to a terminal server, the large contiguous display comprising the plurality of small displays that are controlled by thin clients, the primary terminal client being a gateway device that presents itself as a single client to the terminal server while presenting itself as another server to the thin clients;
receiving, at the primary terminal client, configuration information respectively from a plurality of thin clients, each of the received configuration information including attribute information associated with a separate small display that is part of the large contiguous display;
receiving a remote terminal service environment over a computer network at the intermediate computer, the video data configured for display on the large contiguous display;
reconfiguring the remote terminal service environment for display on the small displays in accordance with the configuration information; and
sending reconfigured remote terminal service environment from the primary terminal client to the small displays.

7. A processor-readable medium storing processor-executable instructions as recited in claim 6, storing further processor-executable instructions configured for:
determining a large display resolution from the configuration information; and
requesting from a network computer, the video data at the large display resolution.

8. A processor-readable medium storing processor-executable instructions as recited in claim 7:
wherein the received configuration information from each of the plurality of clients includes an identification, a location and a screen resolution for one of the small displays that is part of the large display; and
wherein the determining a large contiguous display resolution comprises summing the screen resolutions of the small displays according to a location of each the small displays within the large contiguous display.

9. A processor-readable medium storing processor-executable instructions as recited in claim 6, wherein the reconfiguring the video data comprises:
altering coordinates of a drawing command to correspond to the small displays; or
creating multiple new drawing commands from a single drawing command, each new drawing command corresponding to one of the small displays.

10. A processor-readable medium storing processor-executable instructions as recited in claim 6, wherein the sending comprises determining which of the small displays to send reconfigured video data to based on which portion of the large contiguous display each of the small displays supports.

11. A large display system comprising:
a network server;
a plurality of client computers;
a plurality of small display devices, each small display device to present video data under control of a corresponding client computer;
an intermediate computer to perform tasks that include:
advertising the availability of a contiguous large display to the network server, the large display comprising the plurality of small display devices, the intermediate computer being a gateway device that presents itself as a single client to the network server while presenting itself as another server to the thin clients,
receiving, over a computer network, video data from the network server formatted for display in its entirety on the large display that comprises the plurality of small displays;
receiving configuration data from the plurality client computers the configuration data received from each client computer including a physical location and a display resolution of the display device associated therewith; and
reformatting the video data formatted for the large display for display across the display devices associated with the plurality of client computers, the reformatting of the video data for the large display including dividing the video data into distinct video data portions that may be individually rendered on the display devices associated with the plurality of client computers; and
providing the divided video data to the plurality of client computers for display on the plurality of small display devices.

12. A system as recited in claim 11, wherein the dividing of the video data includes converting coordinates associated with the video data into multiple coordinate sets.

13. A system as recited in claim 12, wherein the intermediate computer is further configured to send a coordinate set of the multiple coordinate sets to each of the plurality of client computers.

* * * * *

UNITED STATES PATENT AND TRADEMARK OFFICE
CERTIFICATE OF CORRECTION

| | | |
|---|---|---|
| PATENT NO. | : 7,737,910 B2 | |
| APPLICATION NO. | : 10/728273 | |
| DATED | : June 15, 2010 | |
| INVENTOR(S) | : Harish Sripad Kulkarni et al. | |

It is certified that error appears in the above-identified patent and that said Letters Patent is hereby corrected as shown below:

In column 12, line 38-39, in Claim 11, delete "computers" and insert -- computers, --, therefor.

Signed and Sealed this
Tenth Day of May, 2011

David J. Kappos
*Director of the United States Patent and Trademark Office*